US011420668B2

(12) United States Patent
    Taylor

(10) Patent No.: US 11,420,668 B2
(45) Date of Patent: Aug. 23, 2022

(54) SHOPPING CART HANDLE COVER

(71) Applicant: Kaila Taylor, Bellevue, WA (US)

(72) Inventor: Kaila Taylor, Bellevue, WA (US)

( * ) Notice: Subject to any disclaimer, the term of this patent is extended or adjusted under 35 U.S.C. 154(b) by 2 days.

(21) Appl. No.: 17/230,506

(22) Filed: Apr. 14, 2021

(65) Prior Publication Data

US 2022/0041202 A1      Feb. 10, 2022

Related U.S. Application Data

(60) Provisional application No. 63/063,919, filed on Aug. 10, 2020.

(51) Int. Cl.
    *B32B 5/26*       (2006.01)
    *B62B 5/06*       (2006.01)

(52) U.S. Cl.
    CPC ............... *B62B 5/069* (2013.01); *B32B 5/26* (2013.01)

(58) Field of Classification Search
    None
    See application file for complete search history.

(56) References Cited

U.S. PATENT DOCUMENTS 5,722,672 A * 3/1998 Frederick .................. B62B 5/06
                                                    16/904

* cited by examiner

*Primary Examiner* — Alexander S Thomas
(74) *Attorney, Agent, or Firm* — Anthony Claiborne

(57) ABSTRACT

A shopping cart handle cover comprises layers of fabric that wrap around the circumference of a shopping cart handle. An inner layer of high friction gripping fabric is in direct contact with the shopping cart handle, preventing the cover from moving around the handle when attached. Affixed along one edge of the inner layer of fabric are narrow strips of one of hook and loop fabric. Overlaying the inner layer is a layer of batting material to provide padding for comfort of the user when gripping the cover around the cart handle. An outer layer of durable fabric overlays the other layers of the cover. Affixed to the outer layer are moderately sized strips of the hook-and-loop counterpart to the strips on the inner layer, the strips on the outer layer affixed to an edge of the cover opposite the edge where strips are affixed to the inner layer.

7 Claims, 4 Drawing Sheets

SHOPPING CART HANDLE COVER

CROSS-REFERENCE TO RELATED APPLICATION

This application claims the benefit of U.S. provisional patent application No. 63/063,919, filed Aug. 10, 2020.

BACKGROUND OF THE INVENTION

Field of the Invention

This invention relates to shopping carts. More specifically, this invention relates to covers for shopping cart handles.

Description of the Related Art

For hygienic purposes, and particularly during times of disease epidemic, it is imperative to limit individual contact with contaminated surfaces to reduce the likelihood of disease transmission. Shopping carts are ubiquitous in modern retail establishments. For infectious agents such as the novel coronavirus of the 2020 pandemic, a shopping cart handle of metal or hard plastic, once contaminated, can remain infectious for 72 hours or longer. Grasped serially by many shoppers, the handle of a shopping cart presents a significant risk of infection from a contagious person to many subsequent shoppers.

Several approaches have been taken to reduce this risk. One approach is to apply disinfectant to the surface, typically by way of toweling the shopping cart handle with a solution containing an effective concentration of isopropyl alcohol, benzalkonium chloride or other disinfectant agent. Limitations to this approach are, first, that the establishment may run out of disinfectant supplies for shoppers. Second, the agent used may not be effective, or may be too dilute to provide thorough decontamination.

Another approach to reduce infection risk is for shoppers to wear disposable or reusable gloves. An obvious limitation for the use of disposable gloves is their availability. During prolonged or extensive periods of epidemic, supplies of disposable gloves may run short. A limitation and risk in employing reusable gloves is the efficacy of cleaning in between uses and the possibility that gloves that are insufficiently decontaminated between uses may themselves become a source of infection.

Yet another approach is the use of disposable sterile covers for the shopping cart handles. As with the use of disposable gloves, availability of supplies limits the utility of this approach.

What is needed is a means for isolating the shopper's hands from possibly contaminated shopping cart handles. What is needed further is such a means that may be repeatedly reused by the shopper so that availability of a depletable single-use resource is not an issue. What is needed further is such a means that is portable and easy to use. What is needed further is such a means that may be cleaned and disinfected with confidence between uses. Yet further, what is needed is such a means that minimizes the risk of user contamination in engaging it with and disengaging it from a shopping cart.

SUMMARY OF THE INVENTION

A shopping cart handle cover comprises layers of fabric that wrap around the circumference of a shopping cart handle. Embodiments of the cover are rectangular in shape. In use, an inner layer of grip stop or similar high friction gripping fabric is in direct contact with the shopping cart handle. The friction afforded by this layer prevents the cover from moving around the handle when attached. Affixed along one edge of the inner layer of fabric are narrow strips of one of hook and loop fabric from material such as Velcro®. In some embodiments, overlaying the inner layer is a thin layer of batting material to provide padding for comfort of the user when gripping the cover around the cart handle. An outer layer of durable fabric such as sport nylon overlays the other layers of the cover. Affixed to the outer layer are moderately sized strips of the hook-and-loop counterpart to the strips on the inner layer, these strips on the outer layer affixed to an edge of the cover opposite the edge where strips are affixed to the inner layer.

In use, the cover is wrapped around the shopping cart handle, with the inner layer of the cover contacting the handle. Advantageously, the user may wrap the cover around the handle without ever directly contacting either the handle or the inner layer of the cover. Beginning with the edge of the cover on which the moderately sized hook-and-loop strips are affixed to the outer layer, the user wraps the cover tightly around the handle until the corresponding narrow hook-and-loop strips on the inner layer engage with the upper layer's strips. Thereby, the handle is covered and the user's hands are isolated from potential contamination.

The user may remove the cover by grasping a corner of the cover's edge and pulling the cover's hook-and-loop adhesion loose, unwrapping the cover. Also advantageously, the user may perform this operation without contacting either the possibly contaminated handle or the inner layer of the cover. The unwrapped cover may then be folded over its potentially contaminated inner layer, leaving only its uncontaminated outer layer exposed for handling. An appropriately dimensioned carrying bag for holding the cover thus folded is attached to the cover. In embodiments, the bag is fabricated of the same durable fabric as the cover's outer layer. The cover, with its potentially contaminated inner layer, may be safely placed in the carrying bag, transported, and removed from the bag for cleaning and decontamination, all without any user contact with the inner layer. After cleaning, the cover may be folded and inserted in the bag for transportation and reuse.

BRIEF DESCRIPTION OF THE DRAWINGS

Objects of the present invention as well as advantages, features and characteristics, in addition to methods of operation, function of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE INVENTION

Figure 1:
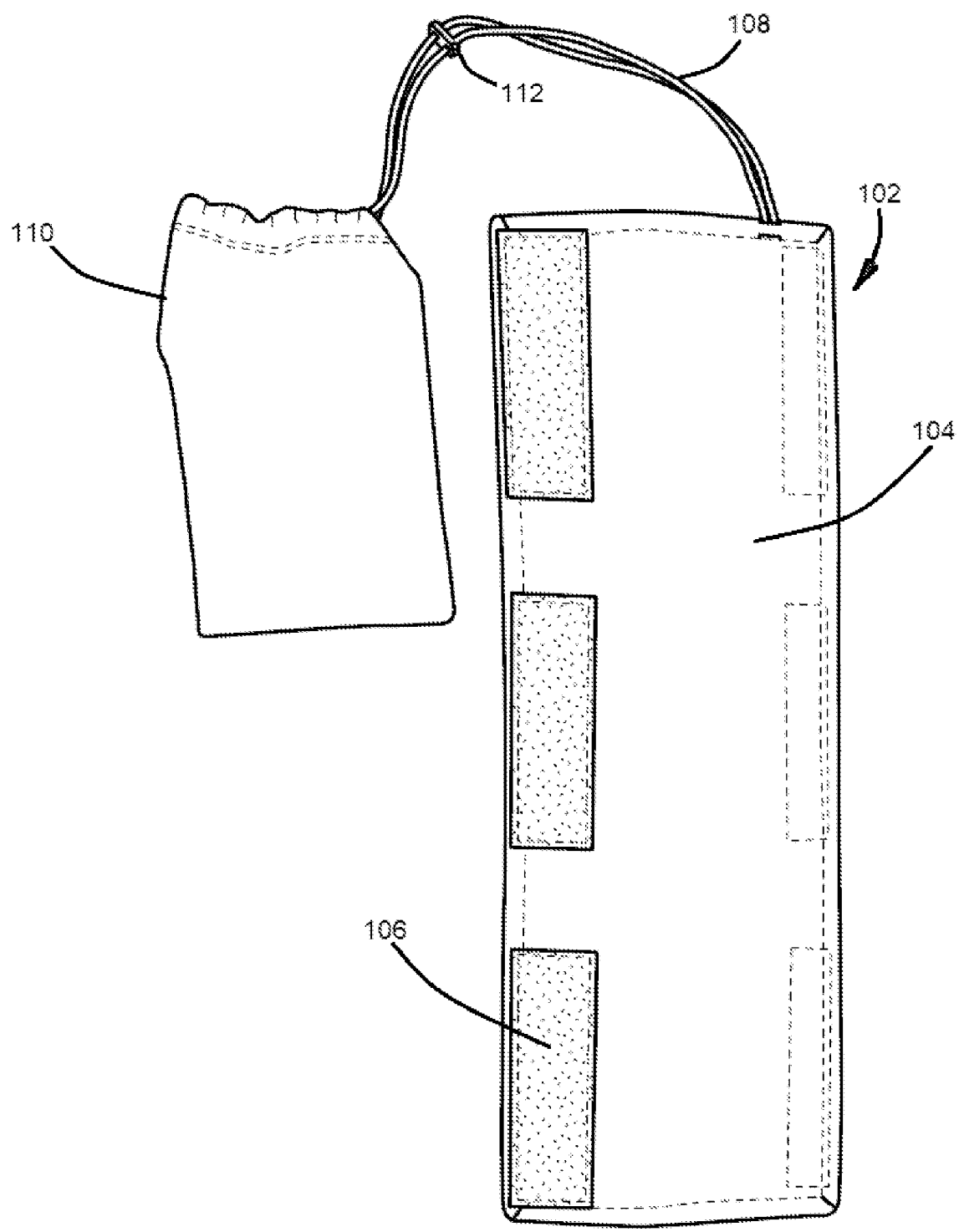
FIG. 1 is an elevation view of the top side of an embodiment of the invention, showing the outer layer.

Turning now to the drawings, FIG. 1 is a top elevation of an embodiment of the invention. Shopping cart handle cover 102 comprises a top layer 104 of durable fabric such as sport nylon. Sewn on one edge of top layer 104 are loop strips 106 of the softer component of hook-and-loop material such as Velcro®, available from Velcro USA, Inc. of Manchester, N.H. Carrying bag 110 connects to cover 102 via cord 108, disposed upon which is tightening bead 112, the operation of which is further described in respect to FIG. 6 below.

Figure 2:
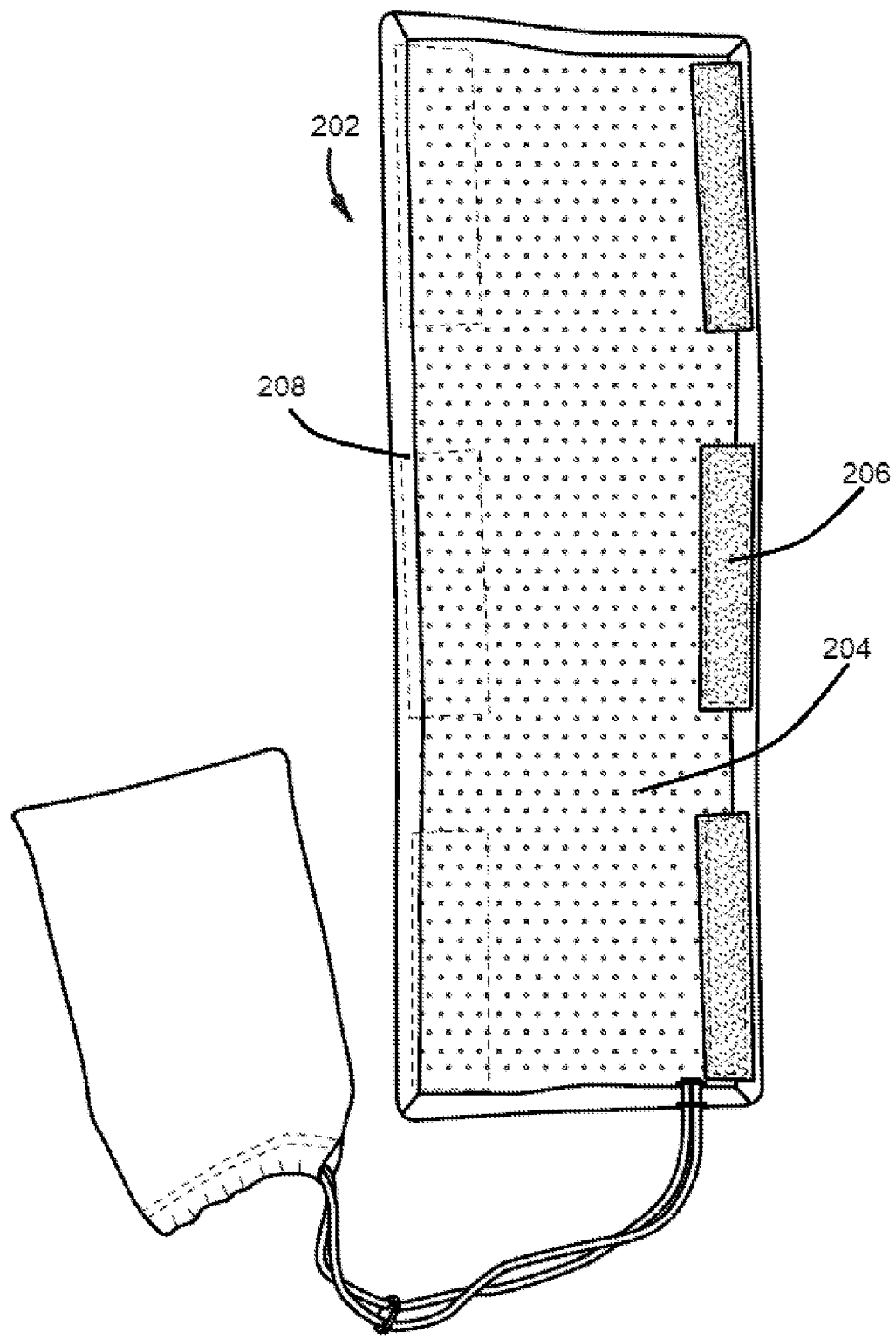
FIG. 2 is an elevation view of the bottom side of an embodiment of the invention, showing the inner layer, along the lines of the embodiment shown in FIG. 1.

FIG. 2 displays a bottom elevation of the bottom layer the invention in an embodiment along the lines of that portrayed in FIG. 1. The bottom layer 204 of cover 202 comprises grip stop or other gripping fabric. Affixed to the right edge of the bottom layer of cover 202 are hook strips 206 of the harder component of hook-and-loop material, corresponding to the complementary loop strips that have been sewn to the top layer of the invention (106 in FIG. 1) by threads demarking areas 208 on the left of the bottom layer of cover 202.

Figure 3:
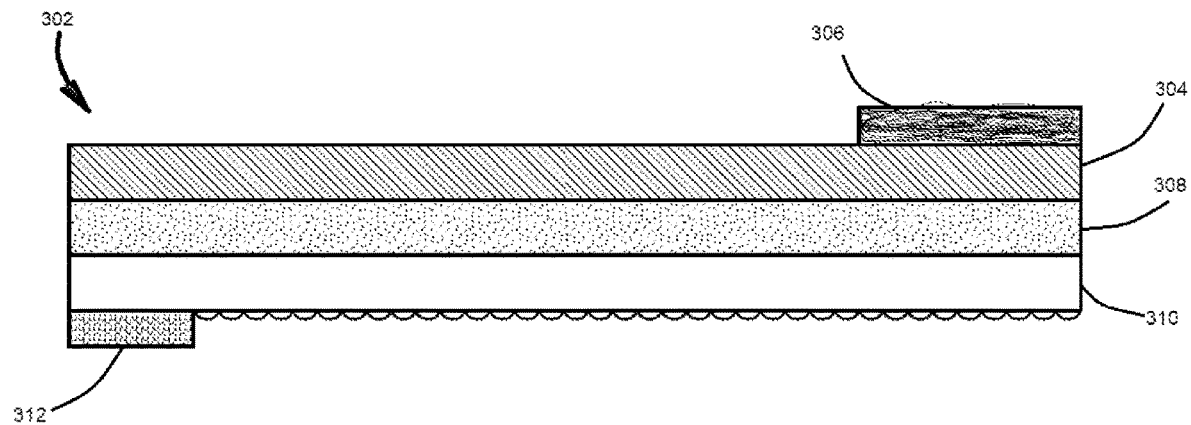
FIG. 3 is a cross-section of the layers of fabric comprising an embodiment of the invention.

FIG. 3 is a cut-away cross-section of an embodiment of the invention. Shopping cart handle cover 302 comprises a top layer 304 of durable fabric. Affixed to one edge of top layer 304 are loop strips 306 of hook-and-loop material. Top layer 304 overlays a middle layer 308 of bunting material provided for padding when cover 302 is in use on a shopping cart handle. Bottom layer 310 is grip-stop fabric, having an exposed surface of high friction plastic material, in this embodiment characterized by protrusions that enhance the material's friction grip. Affixed to bottom layer 310, on an edge opposite the edge on which loop strips 306 are affixed to top layer 304, are hoop strips 312 for engaging loop strips 306 when cover 302 is wrapped around a shopping cart handle.

As will be understood by those in the art, the durable fabric top layer of the invention, such as depicted as cover 302 in the embodiment depicted in FIG. 3, can comprise sport nylon fabric, such as that available from He Fu Ni Ge Apparel Co., Ltd. of Dongguan city, China. Bunting material for padding, shown as middle layer 308 in FIG. 3, is widely available from most fabric suppliers. The grip-stop fabric, depicted as bottom layer 310 in FIG. 3, may be obtained from a variety of sources, such as Eastex Products, Inc. of Plymouth, Mass., which provides grip-stop fabrics in their Slip-Not product line.

Figure 4:
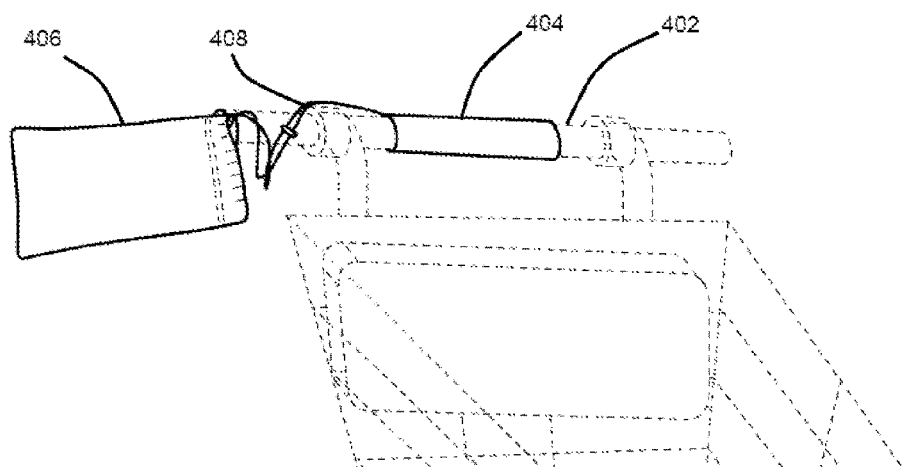
FIG. 4 shows an embodiment of the cover wrapped around a tube representing a shopping cart handle, also showing the attached carrying bag.

FIG. 4 shows the invention in use. Cover 402 is wrapped around a shopping cart handle 404. Carrying bag 406 is connected to cover 402 by cord 408. Thereby, a user always has the bag handy for storage and transportation of a folded cover when finished with use.

Figure 5:
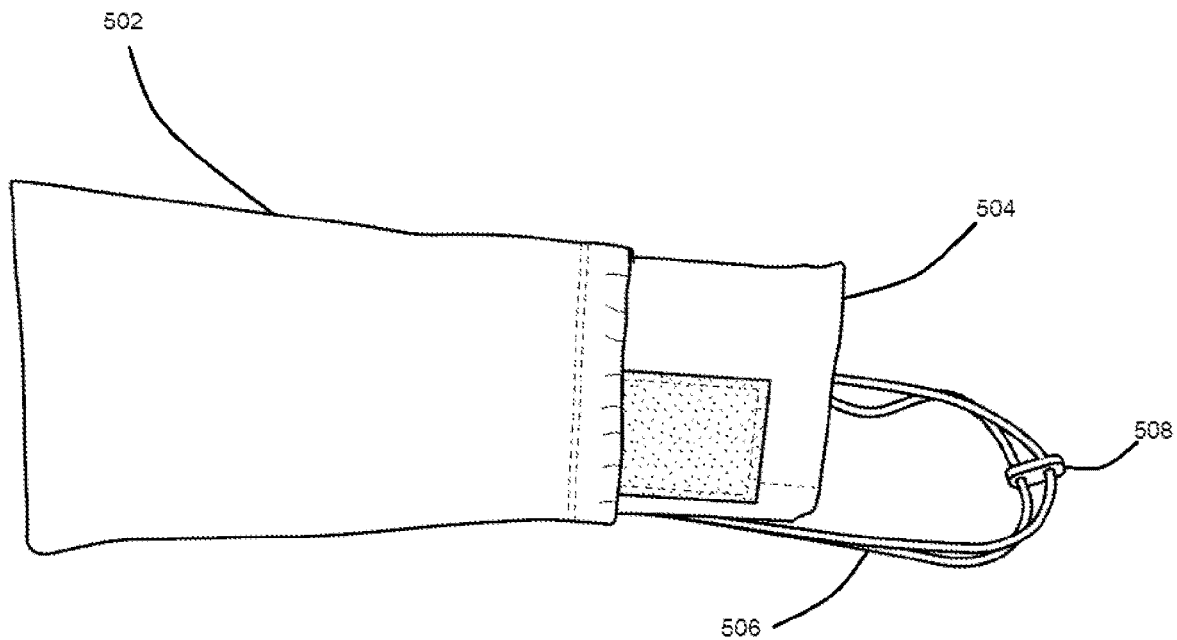
FIG. 5 shows an embodiment of the invention in which the cover has been folded and is partially inserted into its carrying bag.

In FIG. 5, cover 504 has been folded and partially inserted in bag 502, showing cord 506 connecting cover 504 to bag 502. Persons of skill in the art will understand that the carrying bag may be fashioned such that the connecting cord may also serve as a draw string to secure the opening of the bag. In such embodiments as depicted here, a slidable tightening bead 508 may be used to secure closure. In the depicted embodiment, tightening bead 508 has not yet been used to secure the bag 502 closed.

Figure 6:
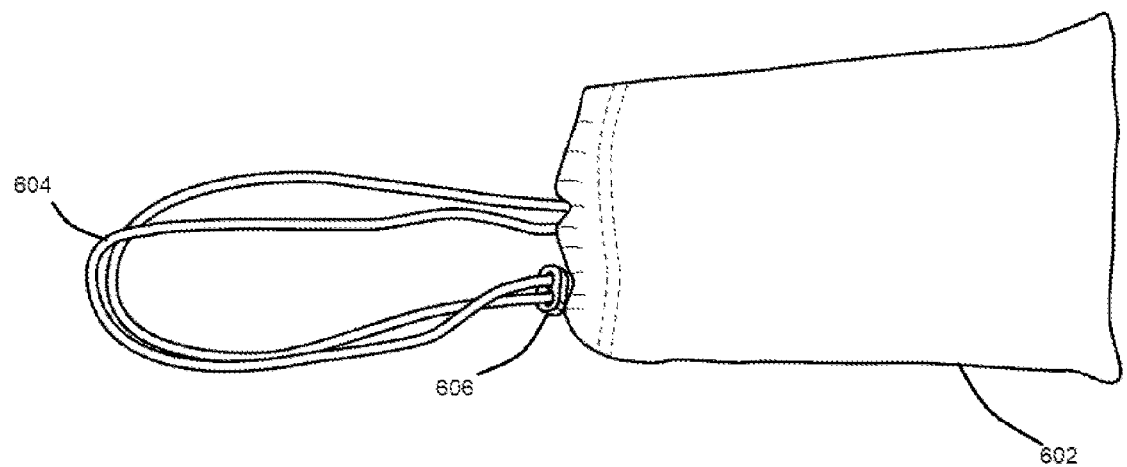
FIG. 6 shows the carrying bag containing a folded cover in an embodiment of the invention.

In FIG. 6, the bag 602 fully encloses the cover, which is still attached to the bag by cord 604. Tightening bead 606 has been moved along cord 604 to be tightened against bag 602, held in place on cord 604 and thereby securing the opening of bag 602 to retain the cover inside it.

As will be appreciated by those of skill in the art, a wide variety of embodiments are possible within the scope of the invention. For example, different sizes of covers with corresponding differently sized carrying bags may be required for different sorts of carts, as in supermarkets where smaller carts are provided along with regular carts. Further, some carts are fashioned having very large and/or irregularly shaped handles, requiring a cart cover of a differently dimensioned design. Yet further, embodiments may provide a telescoping or other means for adjusting the size of a given cover as needed to accommodate the dimensions of a particular cart handle. It is intended that all such embodiments be encompassed by the concept of the present invention.

While the invention has been described with a certain degree of particularity, it should be recognized that elements thereof may be altered by persons skilled in the art without departing from the spirit and scope of the invention. Accordingly, the present invention is not intended to be limited to the specific forms set forth herein, but on the contrary, it is intended to cover such alternatives, modifications and equivalents as can be reasonably included within the scope of the invention. The invention is limited only by the following claims and their equivalents.

I claim:

1. A cover for a shopping cart handle, the shopping cart handle having a handle length and a handle circumference, the cover comprising:
   a rectangular fabric laminate having a laminate length and a laminate width,
   the laminate length being less than or equal to the handle length and the laminate width being greater than the handle circumference, the rectangular fabric laminate further having a front edge and a trailing edge along the laminate length, the rectangular fabric laminate comprising:
   a top layer comprised of durable fabric material,
   strips of loop material affixed above the top layer along the front edge,
   a middle layer comprised of bunting material below the top layer,
   a bottom layer comprised of grip-stop fabric material below the middle layer, and
   strips of hook material affixed below the bottom layer along the trailing edge and corresponding to the strips of loop material affixed along the front edge above the top layer.

2. In combination, a shopping cart handle cover and a carrying bag, the combination comprising:
   the shopping cart handle cover, comprising a rectangular fabric laminate having a front edge and a trailing edge, the rectangular fabric laminate comprising:
   a top layer comprised of durable fabric material,
   strips of loop material affixed above the top layer along the front edge,
   a middle layer comprised of bunting material below the top layer,
   a bottom layer comprised of grip-stop fabric material below the middle layer, and strips of hook material affixed below the bottom layer along the trailing edge and corresponding to the strips of loop material affixed along the front edge above the top layer, the carrying bag dimensioned to retain the shopping cart handle cover, and a cord connecting the shopping cart handle cover to the carrying bag.

3. The shopping cart handle cover and the carrying bag according to claim 2, in which the cord is a drawstring for the carrying bag.

4. The shopping cart handle cover and the carrying bag according to claim 3, further comprising a retaining bead slidably disposed on the drawstring.

5. A cover for a shopping cart having a handle length and a handle circumference in combination with a carrying bag, the combination comprising:

the cover, comprising:

a rectangular fabric laminate having a laminate length and a laminate width, the laminate length being less than or equal to the handle length and the laminate width being greater than the handle circumference, the rectangular fabric laminate further having a front edge and a trailing edge along the laminate length, the rectangular fabric laminate comprising:

a top layer comprised of durable fabric material, strips of loop material affixed above the top layer along the front edge;

a middle layer comprised of bunting material below the top layer, a bottom layer comprised of grip-stop fabric material below the middle layer;

strips of hook material affixed below the bottom layer along the trailing edge and corresponding to the strips of loop material affixed along the front edge above the top layer;

the carrying bag, dimensioned to retain the cover, and a cord connecting the cover to the carrying bag.

6. The cover and the carrying bag according to claim 5, in which the cord is a drawstring for the carrying bag.

7. The cover and the carrying bag according to claim 6, further comprising a retaining bead slidably disposed on the drawstring.

* * * * *